Figure 1:
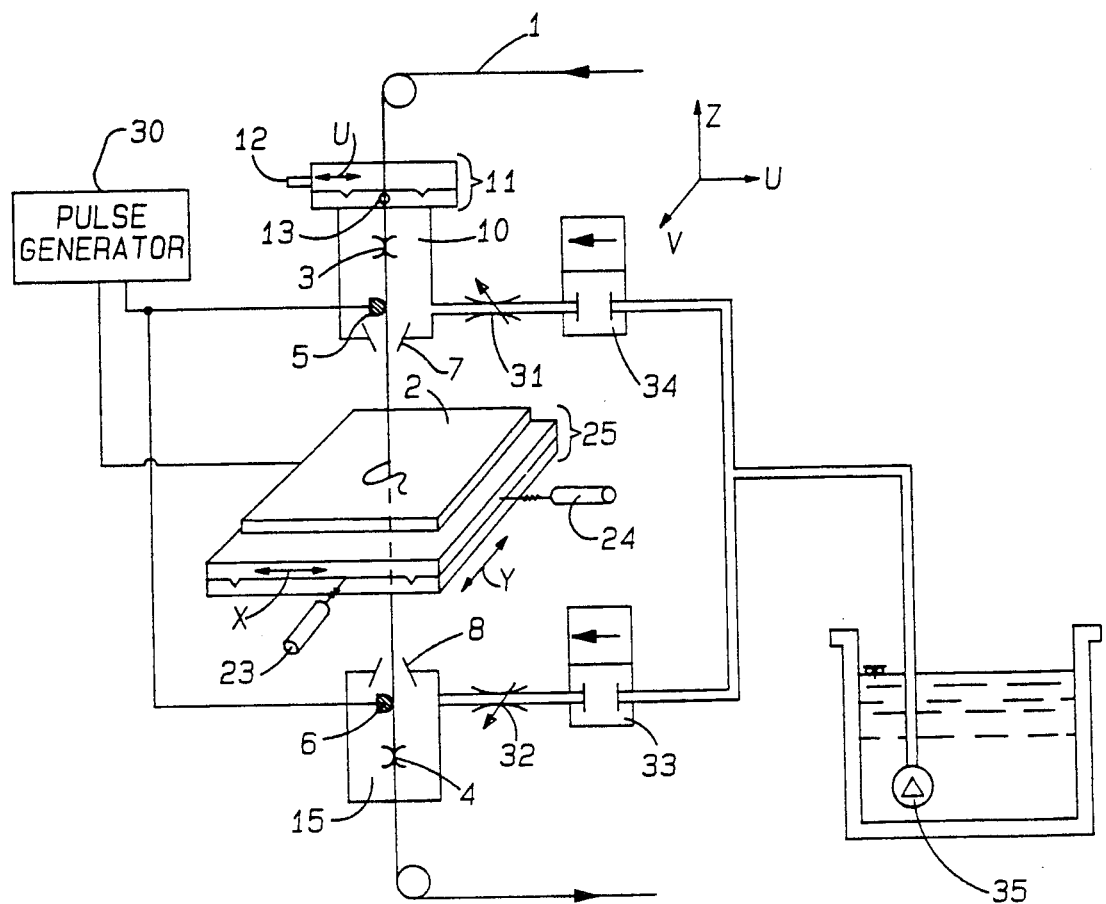
Figure 1:
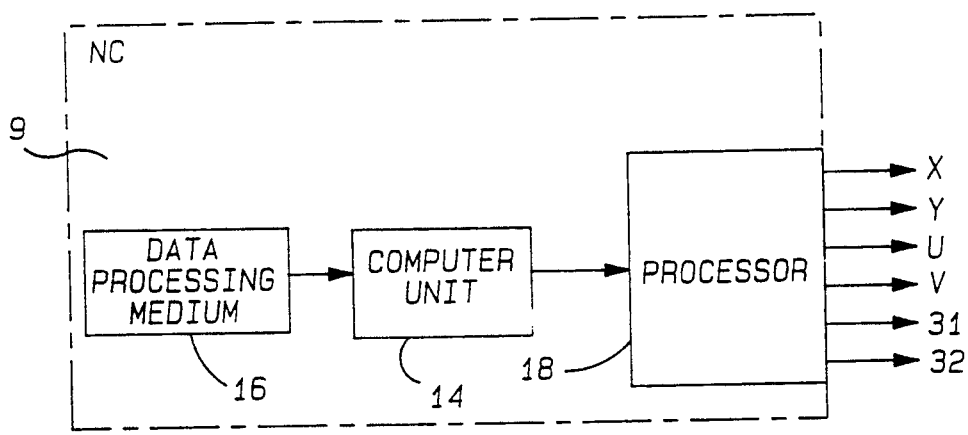

United States Patent [19]

Reynier et al.

[11] Patent Number: 5,122,630
[45] Date of Patent: Jun. 16, 1992

[54] DEVICE AND CONTROL PROCESS FOR AN EDM CUTTING MACHINE PREVENTING WIRE BREAKAGE

[75] Inventors: Alain Reynier, Ferney Voltaire, France; Lorenzo Crivelli, Vernier-Ge; Ivano Gazzetta, Geneva, both of Switzerland; Roland Martin, Valleiry, France

[73] Assignee: Charmilles Technologies S.A., Meyrin, Switzerland

[21] Appl. No.: 465,304

[22] Filed: Jan. 16, 1990

[30] Foreign Application Priority Data

Jan. 13, 1989 [CH] Switzerland ............ 00100/89

[51] Int. Cl.$^5$ .................. B23H 7/02; B23H 7/20
[52] U.S. Cl. .................. 219/69.12; 219/69.17
[58] Field of Search ............ 219/69.12, 69.13, 69.17, 219/69.18, 69.19

[56] References Cited

U.S. PATENT DOCUMENTS

| | | | |
|---|---|---|---|
| 3,973,104 | 8/1976 | Ullmann et al. | 219/69.16 |
| 4,005,303 | 1/1977 | Inoue | 219/69.13 |
| 4,057,703 | 11/1977 | Pfau | 219/69.13 |
| 4,078,163 | 3/1978 | Bell, Jr. et al. | 219/69.12 |
| 4,306,136 | 12/1981 | Delpretti | 219/69.13 |
| 4,370,536 | 1/1983 | Kruth | 219/69.17 |
| 4,581,513 | 4/1986 | Obara et al. | 219/69.12 |
| 4,685,064 | 8/1987 | Kinoshita et al. | 364/474.15 |
| 4,806,719 | 2/1989 | Seerieder et al. | 219/69.13 |
| 4,825,030 | 4/1989 | Demellayer | 219/69.12 |
| 4,888,462 | 12/1989 | Diot et al. | 219/69.12 |

FOREIGN PATENT DOCUMENTS

| | | | |
|---|---|---|---|
| 120024 | 5/1988 | Japan | 219/69.19 |
| 318210 | 12/1988 | Japan | 219/69.18 |

Primary Examiner—Geoffrey S. Evans
Attorney, Agent, or Firm—Gifford, Groh, Sprinkle, Patmore and Anderson

[57] ABSTRACT

Device and process to control at least one machining parameter of an electrode-wire EDM machine according to a protection strategy, in particular to avoid short-circuits, or to improve machining conditions so as to obviate the risk of electrode-wire breakage. That strategy consists of the following stages: continuous monitoring of the variation of a factor, a change in which beyond a predetermined critical threshold is an indication of risk of breakage and/or a drop in machining quality; gradual and stepped variation of one or more parameters as soon as a monitored factor exceeds its critical threshold and as long as it remains beyond this threshold, or as long as the parameter has not reached a predetermined final value, the duration of these steps being slaved to the variation of this factor; where necessary, machining at a rate corresponding to the value of the modified parameter; gradual and stepped variation of the parameter, but in the opposite direction, so as to return it to its initial value, as soon as the factor has returned below its critical threshold.

26 Claims, 2 Drawing Sheets

DEVICE AND CONTROL PROCESS FOR AN EDM CUTTING MACHINE PREVENTING WIRE BREAKAGE

This invention deals with a device and a control process for an EDM machine with an electrode-wire using automatic modification, at certain moments in the machining process, of at least one machining parameter, particularly intended to prevent wire breakage, and this without having to stop machining.

In the present state of the art, various processes have been proposed to control EDM machining by automatically regulating some machining parameters, such as speed, particularly intended to prevent degradation in machining, which could cause the electrode wire to break, or the appearance of short-circuits, which would also result in wire breakage.

For example, by adaptive control, it is known how to determine the ideal machining conditions (machining voltage, frequency of pulses producing discharges, etc.) enabling cutting of a given part at optimum speed while preventing breakage of the wire. For example, this determination is obtained by continuously measuring the machining voltage and current, by using equations obtained from a theoretical model, involving average voltages and currents obtained over a great number of latest measurements continuous calculating, in real time, of reference values. Calculation of these values enables the appearance of risk of breakage to be foreseen, and enables continuous control of modification of machining conditions, that control being automatic and programmed so as to keep these values below under or upper a reference threshold.

It is also known that wire breakage can be avoided by decreasing the machining speed so as to reduce the risk of short-circuits when traversing a cavity or slot, when arriving at the edge of a part at end of machining or, on the contrary, on starting machining.

The present invention is intended to automatically regulate at least one machining parameter by establishing a protection strategy. One of its objects is to prevent wire breakage by gradually varying one or more parameters, following the changes of at least one appropriate variable. These parameters include: pulse frequency, current, voltage, discharge ignition voltage, delay time before ignition of the spark, injection pressure, wire mechanical tension or feed rate and servo mechanism feed rate. This variation is intended to be obtained in steps, as rapidly as possible, so as not to affect a machining speed while increasing its safety and automation, and preventing time losses due to rethreading of the wire subsequent to breakage. In particular, a strategy of this type is used to reduce the machining rate when there is a risk of short-circuits or a risk of wire breakage subsequent to a decrease in machining quality, and to reestablish the initial rate when this risk has disappeared.

The present invention deals with an EDM machine enabling implementation of a strategy of this type, according to which the duration of the parameter variation steps is slaved to changes in factors providing an image of the conditions existing in the slot machined in the workpiece by the wire. One of these factors can be the values mentioned above, which causes this strategy to be started by exceeding a predetermined limit. The present invention deals also with machining processes which make use of this strategy.

Let us briefly review the operation of an electrode-wire EDM machine, such as that illustrated in FIG. 1:

an electrode-wire 1 passes continuously between two wire guides 3 and 4 arranged on either side of the part to be machined 2, due to mechanisms (not shown) driving the wire while braking it so as to provide it with a predetermined mechanical tension. Two rubbing contacts 5 and 6 conduct the machining current, emitted by pulse generator 30, to the electrode-wire, while two injection nozzles 7 and 8 direct the machining liquid jets along wire 1 and into the slot cut in part 2 by the wire:

wire guide 3, nozzle 7, and upper contact 5 are arranged in work head 10, mobile along the vertical axis Z, and, in general, also mobile (along relatively short travels) in a horizontal plane, according to two orthogonal axes U and V, enabling the wire to be inclined, while the lower wire guide 4 remains fixed. This movement (U, V) is obtained by a crossed movement table 11, actuated by a servo mechanism (of known type, but not shown) including the two motors 12 and 13. The bottom work head 15 containing the lower wire guide 4, lower nozzle 8 and lower contact 6, remains fixed with respect to the machine structure;

the part to be machined 2 is attached by its mechanism, not shown, to a table which is itself attached to the bottom of the work tank (not shown) filled with the machining liquid. The latter is mobile according to two horizontal and orthogonal axes X and Y by means of a crossed movement table 25, actuated by a servo mechanism (of known type, not shown) including two motors 23 and 24;

the cutting trajectory is stored on a data processing medium 16, which sends its data to computer unit 14 of numerical control 9. The latter also features an appropriately programmed unit, at least one memory and a drive, together with installation 18 (processor or interpolator) monitoring and controlling the relative movements between the workpiece 2 and electrode-wire 1, by actuating motors 12, 13, 23 and 24, and monitoring other machining parameters such as machining liquid injection pressure, by activating solenoid valves 31 and 32. The computing unit 14 evaluates the cutting trajectory and sends control signals to interpolator 18 intended to distribute the movements along both directions X and Y, activated by motors 23 and 24;

the pulse generator 30 is connected between two electrodes 1 and 2 so as to emit successive voltage pulses intended to start discharges in the machining area. It receives signals from numerical control 9 (link not shown), for example, to control a given variation in pulse frequency, voltage or spark duration; and the dielectric tank feeds the work tank and the injection circuits to nozzles 7 and 8 of the work heads. These are shown diagrammatically in FIG. 1 by pump 35 and solenoid valves 31 and 32 connected to the liquid distributor valves 33 and 34.

Control of the machining rate, according to the present invention, is obtained as follows:

The changes of at least one factor are followed up for example, an integrated machining voltage provided by a unit of the machine numerical control, or the rate of sparks without ignition delay time, variation of which beyond a given threshold is an indication of a downgrading of the machining;

as soon as this factor reaches this critical reference value, the value V of the parameter(s) to be modified is varied, for example the frequency of the pulses emitted by the generator or the injection pressure, by a given first quantity Q, this modification being, for example, a decrease;

this variation can cause a variation of the monitored factor(s) subsequent to a change in machining conditions; as long as the value of this or these factors remains beyond the critical threshold, the decrease in the parameter(s) is continued, in steps of given quantities $Q_x$, and this until this or these parameters are reduced to a scheduled value $V_iX$), or, until each factor has returned on the first side of the critical threshold (the parameter having only reached value $V(x)$; it should be noted that when the modified parameter is a factor of the discharge power, its reduction results in a variation in feed rate, automatically obtained by the servo mechanisms controlling the relative movement;

if necessary, machining is continued for a certain time at low rate, keeping the parameter at the value obtained subsequent to the successive variations ($V(X)$ or $V(x)$);

when by returning on the first side of the critical threshold, changes in the factor monitored indicate a decrease in the risk of breakage and an improvement in machining quality, the parameter or parameters are modified in the opposite direction, again proceeding by step and slaving the duration of these steps to the changes in the monitored factor(s) as described above, so as to return to the initial machining rate. For example, if an increase is involved, the value of the parameters is increased by a quantity $Q'$;

this may cause a variation of the monitored factor or factors subsequent to a change in machining conditions; as long as the value of this or these factors remains on the same side of the critical threshold, the parameter(s) is/are continued to be increased by given quantities $Q'x$;

when the parameter is again at value V, machining is continued at the initial rate.

These sequences of successive parameter increases and decreases are not programmed. It is the end of the change in the factor which indicates the end of each step, and whether the parameter is to be increased or decreased by a specified quantity.

Two reference thresholds, enclosing a critical zone, can be forecast; as long as the factor changes within this zone, the parameter is kept at its actual value.

Gradual stepped variations are thus used, the durations of which are generally variable from one step to the next, and are determined by the times taken by the factor or factors to vary in reply to each of the modifications made to the parameter(s).

The quantities Q, Qx, Q', Q'x may be equal or different for each of the decrements and increments (elementary variations) obtained. These quantities may be sufficiently low (and the steps sufficiently numerous) for the variation to be gradual and practically continuous.

The variable whose change beyond a certain limit initiates the protection strategy described above may be different from the factor(s) whose changes are used to control the duration of the variation steps.

Therefore, the objective of the present invention is a device for an electrode-wire EDM cutting machine.

This invention is also a control (or monitoring) process for an electrode-wire EDM machine.

This process is used either to decrease or to increase a parameter so as to reestablish adequate machining conditions, i.e., machining without risk of breakage, then to increase or decrease the parameter, to bring it back to its initial value, when the danger of breakage has disappeared.

The parameter which was varied to stop a decrease in the quality of machining conditions is in general one of the machining rate factors, in particular of the power of the pulses emitted by the generator, such as the frequency of these pulses, the intensity of the machining current, the sparking duration or the sparking voltage. Variation of this parameter can be accompanied by variation of one or more other parameters, for example a variation in liquid injection pressure and/or the wire mechanical tension and/or the wire feed rate. In particular, this reinforces the effect of the decrease in pulse frequency on wire slack.

The factor providing an image of machining conditions is, for example, the mean machining voltage, the slaving voltage (difference between the mean reference voltage and the mean machining voltage), or the average duration of the discharge ignition time, or the rate of sparks without ignition delay time. Moreover, it is possible to monitor changes in wire resistance, for example by using the appliance described in, or that of mechanical damage to the wire, for example by means of one of the appliances described U.S. Pat. No. 4,825,030 or changes in conductivity; a decrease in the latter may be an indication of the appearance of gas bubbles, and therefore decreased machining quality.

The quantities by which the parameter(s) are varied at each step, together with the number of these steps, the final value $V(X)$ reached by the parameter(s) or the critical threshold(s) reached by the controlling factor(s) and indicative of a certain level of decreased machining quality, or giving the signal for implementation of the protection strategy were, for example, predetermined experimentally by choosing values enabling short-circuits and wire breakage to be avoided, while modifying the machining rate as little and as quickly as possible. These values can, for example, be stored on an appropriate data processing medium, connected to the computer unit of the EDM machine numerical control. For example, these depend on the material pair and/or on the height of the workpiece and/or on the material and geometry of the electrode-wire.

The protection strategies described herein can also be used to vary a parameter when machining requires rate modification, for example when cutting along a curved path, or cutting a workpiece of variable thickness.

The invention shall be illustrated below by some of the numerous possible uses, given solely as an example, but without being limited to these.

In the examples given, two factors are supervised simultaneously indicating the status of machining conditions:

the mean control voltage Usai; and the rate TL 17 of sparks igniting without delay.

It is possible to activate or deactivate monitoring of one of these factors. It is also possible to replace these by another factor related to this rate, or to this mean voltage. For example, the first one can be used to start this strategy, the second one to control the durations of the variation steps of the parameter.

Usa is determined by continuously measuring machining voltage Um using a measurement circuit of a known type, such as that described in patent CH 654.233. By means of a second circuit, its mean $\overline{Um}$ is determined, and it is then compared to value $\overline{Ur}/$ of this mean obtained at the nominal rate, by calculating error signal Usa - Um - $\overline{Umr}$. The value Usai is obtained by integrating Usa on a train of successive measurements performed over the previous 80 milliseconds, by the element 22 illustrated on FIG. 2.

The rate TL is the number of sparks igniting without delay time, observed during a given time or for a given number of succeeding pulses, the generator 30 being set to a given pulse interval time.

These factors have several experimentally determined values or reference thresholds:
for Usai: Usa B ("low" Usa)
Usa N ("normal" Usa)
Usa H ("high" Usa)
Usa HO ("off work-piece" Usa)
for TL: TL H (reference TL)
TL B ("good" TL)
TL M ("bad" TL)

Two parameters are varied: pulse frequency f and injection pressure p.

It has been experimentally determined that short-circuits are avoided for a low frequency $F(x) \geq F/4$, and for a low pressure $P(x) - P/4$, F and P being the nominal machining rate pulse frequency and injection pressure, i.e., the rate used before the decrease in machining quality.

EXAMPLE 1 - WIRE RECOIL

Wire recoil can occur when the wire emerges from a small diameter hole because the liquid under pressure in the hole is evacuated through the slot and brings the wire with it. If no action is taken, recoil increases and can cause a short-circuit against a machined surface, or even draw the wire from the slot. This results in an increase in Usai such that Usai Usa H. As soon as Usai reaches this threshold, a signal triggers the protective device, i.e., causes an initial decrease in f and p. These decreases are such as to reduce or even suppress slack.

This initial decrease $Q_1$ in frequency f and $Q_2$ in pressure p is such that:

$$Q_1 = \frac{F - F/4}{8} \text{ and } Q_2 = \frac{P - P/4}{8}.$$

Figure 2:
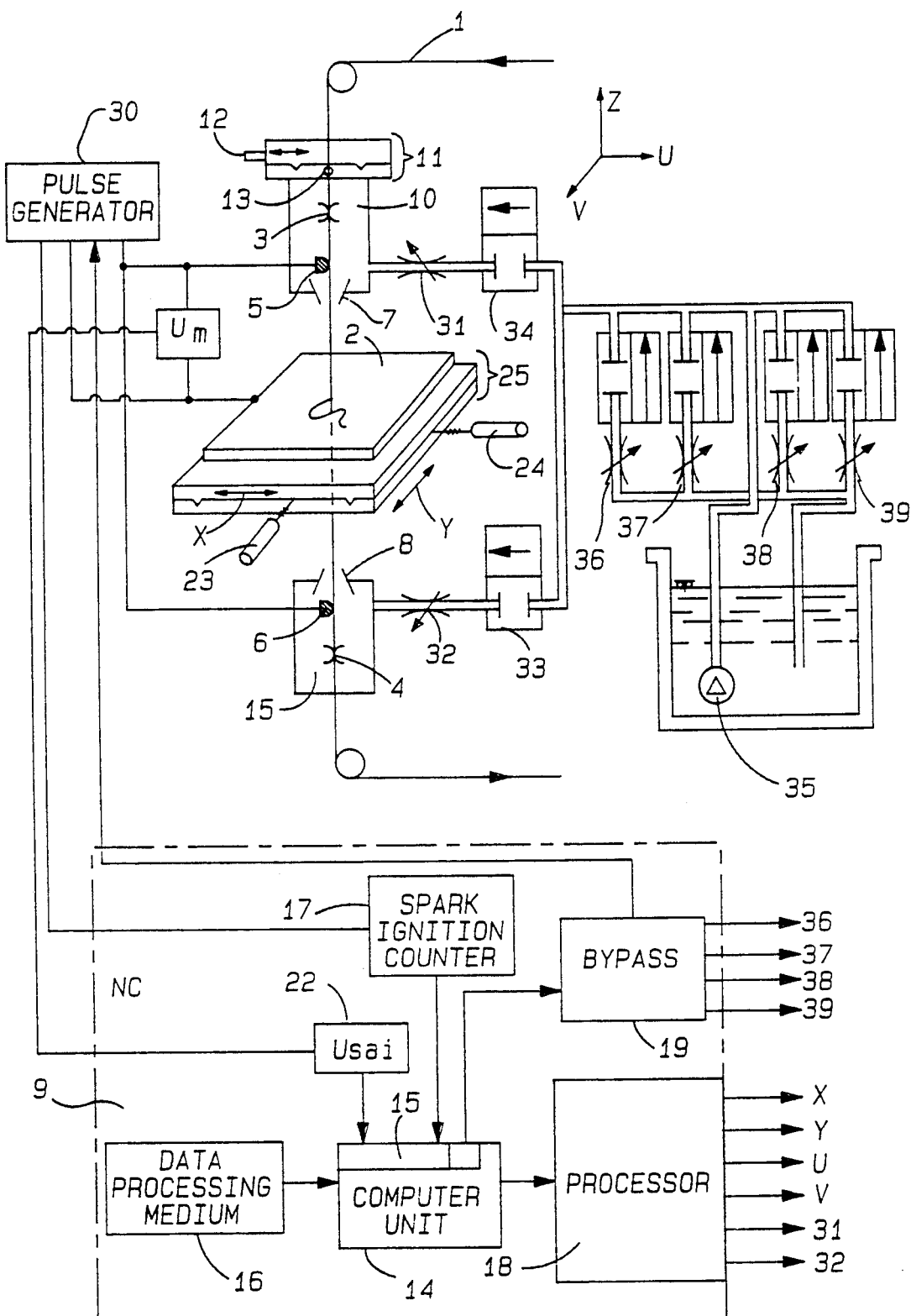

The pressure is controlled by a battery of four solenoid valves 36 to 39 connected in parallel to the bypass 19 of high pressure pump 35 feeding the machining liquid from a storage tank up to the distribution network to the injection nozzles 7 and 8 and the work tank (see FIG. 2).

If after a given time, Usai is still not less than Usa H, a further decrease $Q_1$ and $Q_2$ in frequency f and pressure p is made, and so on until $f = F/4$ and $p = P/4$.

EXAMPLE 2 - EDGE OF WORKPIECE AND EXIT FROM WORKPIECE

When the nozzle outlet port approaches the edge of the workpiece, the pressure of the liquid jet emitted through this port decreases, resulting in incorrect irrigation of the machined slot. The machining conditions decrease, resulting in a clear increase in the rate TL. As soon as TL reaches reference threshold TLH, a signal causes a decrease in frequency f, and if necessary an increase in pressure p. That signal is emitted by the counter 17 illustrated at FIG. 2. In this example also, this decrease is of value $Q_1$ as defined above. Provisions are also made to reduce f to value F/4, F being the nominal frequency, i.e. corresponding to non-decreased machining quality, as defined above. As in example 1, the procedure is made in steps. until it can be seen that TL < TLH or until $f = F/4$.

Machining is made at low rate until the wire has reached the edge of the workpiece, or until it is again directed towards the center of the workpiece, depending upon the specified path:

In the case of exit from the part, Usai increases, and the procedure of example 1 is followed, except that the frequency has already reached final value F/4 and that the reference value of Usai which triggers the variation in frequency f and pressure p is Usa HO (Usa HO > Usa H); and in the second case, factor TL decreases, indicating an improvement in machining conditions. As soon as TL is $\leq$ TLB, an increase in rate is started by gradually increasing f in steps; this procedure is maintained until f has returned to initial value F.

This protection strategy can obviously be combined with the strategy described in the EP 378278 application for cutting an arc or angle. This is the minimum rate (minimum frequency) to be taken into account.

EXAMPLE 3 - FEED-IN TO WORKPIECE

TL and Usai are still monitored simultaneously.

Starting from a value Usai > Usa HO, indicating that the wire is away from the workpiece, machining is made at minimum rate: $f = F/4$ and $p = P/4$.

As soon as the wire enters the workpiece, Usai decreases rapidly. When Usai reaches a zone enclosing reference value Usa N, a signal is sent to command an initial increase in frequency and pressure. When the end of the first step is reached, the next increase in rate is made, and so on until $f = F$ and $p = P$, insofar as Usai remains within this zone, and TL remains less than TLM.

The examples above dealt with protective procedures implemented to react to a decrease in machining quality, which does not necessarily involve a risk of short-circuits. Other types of protection can be used to respond to the appearance of a risk of short-circuits.

EXAMPLE 4 - MONITORING AT AN IMMINENT SHORT CIRCUIT

This risk is detected by observation of a decrease in Usai below critical threshold Usa B. The wire may tend towards the short-circuit in several cases:
either on feed-in to a workpiece, because the speed is too high,
or because the wire is pushed "forward" by the pressure. This may occur when the wire leads in to a transverse cavity; the machining liquid surges into the cavity, drawing the wire with it. This is a very fast phenomenon and leads to a clear and definitive short-circuit.

In the first case, the minimum rate is the current rate (see Example 2).

Conversely, in the second case, the reaction consists in decreasing frequency f and injection pressure p. Successive reductions are made in steps until Usa < Usa B.

We claim:

1. A device for an EDM cutting machine having a wire-electrode, said device including a generator connected between two electrodes and emitting voltage pulses, and a numerical control unit for controlling the relative movements between a work-piece and upper and lower wire guides, said voltage pulses being emitted by said generator and the pressure of injection of a fluid into a machining slot, said device comprising:

at least one means for determining and continuously following the variation of an appropriate factor, the evolution of which beyond a certain critical reference threshold indicates a downgrading of machining conditions, said at least one means continuing to follow the variations of said appropriate factor as long as said variation of said appropriate factor remains beyond said critical reference threshold, said numerical control unit connected to said at least one means to generate a signal to produce a stepped variation of at least one parameter affecting said machining conditions in response to said variation of said appropriate factor exceeding said critical response threshold, said numerical control unit equipped to stop said stepped variation of said at least one parameter when said appropriate factor has returned to its initial value, and actuators responsive to said signal generated by said numerical control unit to vary said at least one parameter by given quantities.

2. The device according to claim 1, in which said numerical control unit generates signals to control variations in the frequency of said voltage pulses emitted by said generator, and variation in said pressure of injection of said machining fluid into said machining slot.

3. The device according to claim 1, in which said numerical control unit generates signals to control variations of said at least one parameter by a constant value for each step of said stepped variation.

4. The device according to claim 1, in which said numerical control unit generates signals to control variations of said at least one parameter to obtain said stepped variation with durations which are slaved to said variations of said appropriate factor providing an indication of said machining conditions.

5. The device according to claim 1, in which said numerical control unit terminates said signals to stop said stepped variations of said at least one parameter when a predetermined number of said stepped variations in the same direction have been performed.

6. The device according to claim 1, comprising means for continuously determining a variable characteristic of the risk of breakage of said wire-electrode and for sending a signal to said numerical control unit as soon as said variable characteristic exceeds a predetermined limit.

7. The device according to claim 1, in which one of said at least one means is a circuit measuring the machining voltage existing between a workpiece and said wire-electrode.

8. The device according to claim 7, in which said circuit further comprises means for determining a mean value for said machining voltage, means for calculating a difference voltage between said mean value and a mean machining reference voltage Umr, means for integrating the value of said difference voltage obtained over a determined period, and means for comparing the integrated value of said difference voltage with a reference threshold.

9. The device according to claim 7, in which said circuit further comprises means for determining a mean value for said machining voltage, means for calculating a difference voltage between said mean value and a mean machining reference voltage Umr, means for integrating the value of said difference voltage obtained over a given period and means for comparing said integrated value with said reference threshold.

10. The device according to claim 7, in which said circuit further comprises means for determining a mean value for said machining voltage, means for calculating a difference voltage between said mean value and a mean reference machining voltage Umr and means for integrating the value of said difference voltage obtained over a given period.

11. The device according to claim 1, in which one of said at least one means is a computing unit which determines a mean rate TL of sparks igniting without delay time.

12. The device according to claim 1, in which said at least one means comprises a circuit measuring the machining voltage existing between said workpiece and said wire-electrode.

13. The device according to claim 1, in which said at least one means comprises a computing unit which determines a mean rate TL of sparks igniting without delay time.

14. A control process for an EDM cutting machine, comprising the following steps:

continuously following a variation of at least a first factor of said EDM cutting machine;

varying the value (V) of a machining parameter of said EDM cutting machine by a predetermined quantity (Q) upon said at least a first factor crossing a critical threshold, indicating a downgrading of machining conditions or a wire breakage risk;

following the induced change of said at least a first factor and the induced change of a second factor in response to said variation of the value (V) by said quantity (Q) of said parameter;

repeating the step of varying the value (V) of said parameter of said EDM cutting machine in the same direction by a further predetermined quantity upon the end of each said induced change of said at least a first factor and said second factor, to induce further changes of said at least a first factor and said second factor, until said parameter reaches a desired value V(X) or is returned to its initial value or until said at least one first factor has returned across said threshold on its initial side or until a predetermined number of said variation steps in the same direction have been performed.

15. The process of claim 14, wherein said second factor is a mean rate of sparks igniting without delay time.

16. The process according to claim 15, wherein said steps of varying the value (V) of said machining parameter are dependent upon said changes of the value (V) of said machining parameter after each variation of said mean rate of sparks igniting.

17. The process of claim 14, wherein, said steps of varying said at least a first parameter occurs by increments or decrements of equal amounts.

18. The process of claim 14, wherein said at least a first factor is the value of a difference voltage integrated over a given period, said difference voltage being calculated between a mean value determined for the actual machining voltage existing between said workpiece and said wire-electrode and a mean reference machining voltage.

19. The process of claim 18, wherein said value of said integrated difference voltage is compared to said predetermined critical threshold.

20. The process of claim 14, further comprising stepwise varying in the other direction of said parameter by predetermined quantities upon said at least a first factor returning across said critical threshold, indicating thus an improving of the machining conditions or the disappearance of said wire breakage risk, the durations of said variation steps being the time taken by at least one of said at least a first and said second factor to change after the previous variation of said parameter.

21. A device for an EDM cutting machine having a wire-electrode, said device including a generator connected between two electrodes and emitting voltage pulses, and a numerical control unit for controlling the relative movements between a workpiece and upper and lower wire guides, the voltage pulses emitted by said generator and the pressure of injection of a machining fluid into the machining slot, said device comprising:

first means for determining and continuously following the variation of at least one appropriate first factor, the evolution of which beyond a critical reference threshold indicates a downgrading of the machining conditions or a risk of wire breakage;

said numerical control unit connected to said first means to generate a first signal to produce, in response to said variation of said at least one first factor beyond said threshold, a stepped variation of at least one parameter affecting the machining conditions, and equipped to maintain said stepped variation as long as said at least one first factor remains beyond said threshold;

second means for following up the variation of a second factor which provides an indication about the machining conditions and undergoes a change in response to each variation of said at least one parameter;

said numerical control unit connected to said second means to generate, as soon as said second factor ends said change, a second signal to vary said at least one parameter by a predetermined quantity, obtaining thus variation steps with durations slaved to the time taken by said second factor for its change; and actuators responsive to said second signals to vary said at least one parameter by given quantities.

22. The device according to claim 21, in which said numerical control unit terminates said signals to stop said stepped variation of said at least one parameter when said at least one parameter has reached a final scheduled value.

23. The device according to claim 21, in which said numerical control unit terminates said signals to stop said stepped variation of said at least one parameter when said at least one first factor goes below said threshold.

24. The device according to claim 21, in which said numerical control unit generates signals to control the stepped variation in the frequency of said voltage pulses emitted by said generator, and in said pressure of injection of said machining fluid into said machining slot.

25. The device according to claim 21, in which said numerical control unit generates signals to control the stepped variations of said at least one parameter by a constant value for each step.

26. The device according to claim 21, in which said numerical control unit terminates said signals to stop said stepped variation of said at least one parameter when a predetermined number of said variation steps in the same direction have been performed.

* * * * *

UNITED STATES PATENT AND TRADEMARK OFFICE
CERTIFICATE OF CORRECTION

PATENT NO. : 5,122,630
DATED : June 16, 1992
INVENTOR(S) : Alain Reynier et al

It is certified that error appears in the above-identified patent and that said Letters Patent is hereby corrected as shown below:

Column 2, line 12, after "wire", delete ":" and insert --;--.

Column 3, line 10, delete "ViX)" and insert --V(X)--;

line 26, delete "step" and insert --steps--.

Column 4, line 6, after "the" (second occurrence) insert

--intensity of the--;

line 7, delete "the intensity of";

line 22, after "in", insert --U.S. 4,262,185--;

line 25, after "4,825,030" insert --,--; after "in"

(first occurrence) insert --gap--;

line 55, after "delay" insert --time--;

line 68, "Um" should be deleted, and insert --$\overline{Um}$--.

UNITED STATES PATENT AND TRADEMARK OFFICE
CERTIFICATE OF CORRECTION

PATENT NO. : 5,122,630

DATED : June 16, 1992

INVENTOR(S) : Alain Reynier et al

It is certified that error appears in the above-identified patent and that said Letters Patent is hereby corrected as shown below:

Column 5, line 34, delete "Usai Usa H" and insert --Usai > Usa H--.

Signed and Sealed this

Seventeenth Day of May, 1994

Attest:

BRUCE LEHMAN

Attesting Officer    Commissioner of Patents and Trademarks